(12) United States Patent
Ramaprakash et al.

(10) Patent No.: US 10,237,461 B2
(45) Date of Patent: Mar. 19, 2019

(54) DUAL FORM FACTOR DEVICES HAVING OPERATIVE AND COMPLEMENTARY ALIGNING COMPONENTS

(71) Applicant: Intel Corporation, Santa Clara, CA (US)

(72) Inventors: Nishanth Ramaprakash, Bangalore (IN); Prasanna Krishnaswamy, Bangalore (IN); Sreenidhi A. Koti, Bangalore (IN); Arvind S, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/874,675

(22) Filed: Jan. 18, 2018

(65) Prior Publication Data

US 2018/0255219 A1    Sep. 6, 2018

(30) Foreign Application Priority Data

Mar. 1, 2017    (IN) .............................. 201741007184

(51) Int. Cl.
*H04N 5/225* (2006.01)
*G02B 7/10* (2006.01)
*H04N 5/247* (2006.01)

(52) U.S. Cl.
CPC ........... *H04N 5/2257* (2013.01); *G02B 7/102* (2013.01); *H04N 5/2256* (2013.01); *H04N 5/247* (2013.01)

(58) Field of Classification Search
None
See application file for complete search history.

(56) References Cited

U.S. PATENT DOCUMENTS

| 9,395,606 | B1 * | 7/2016 | Harris | G03B 15/05 |
| 9,986,144 | B2 * | 5/2018 | Tuulos | H04N 5/2257 |
| 2001/0020975 | A1 * | 9/2001 | Kerai | H04M 1/0202 348/14.01 |
| 2006/0014563 | A1 * | 1/2006 | Cheng | H04M 1/0254 455/557 |
| 2013/0076964 | A1 * | 3/2013 | Sirpal | G06F 3/1438 348/333.12 |
| 2015/0355525 | A1 * | 12/2015 | Abrams | G03B 15/02 348/207.11 |
| 2017/0303790 | A1 * | 10/2017 | Bala | H04N 5/332 |

* cited by examiner

*Primary Examiner* — William B Perkey
(74) *Attorney, Agent, or Firm* — Green, Howard & Mughal LLP

(57) ABSTRACT

Embodiments relate to mobile devices and systems having an operative component integrated into a first housing and a complementary component within an opening of a second housing moveably coupled to the first housing such that, in a particular configuration of the device or system, the operative component is aligned with the complementary component to enhance performance of the operative component.

23 Claims, 8 Drawing Sheets

DUAL FORM FACTOR DEVICES HAVING OPERATIVE AND COMPLEMENTARY ALIGNING COMPONENTS

CLAIM OF PRIORITY

This Application claims priority to IN Patent Application No. 201741007184, filed on 1 Mar. 2017 and titled "DUAL FORM FACTOR DEVICES HAVING OPERATIVE AND COMPLEMENTARY ALIGNING COMPONENTS", which is incorporated by reference in its entirety for all purposes.

BACKGROUND

In some implementations, mobile devices such as mobile phones and tablets and the like may have a form factor that is as sleek as possible for a better look and better usability. As a result of the reduced z-thickness available in the housing or chassis of such devices, there are challenges in integrating camera modules that provide improved imaging capabilities or other modules that require a higher z-thickness. In particular, camera modules being integrated into the devices may be limited to wide field of view (FOV) lenses due to the space constraints. Accommodating better cameras with slightly higher thickness may result in an undesirable bump in the housing where the camera is located. To attain more advanced imaging solutions may require the use of clip-on accessories connected to the mobile device through a Bluetooth connection, a Universal Serial Bus (USB) connection, or the like.

As such, there is a continual need for improved imaging capabilities in mobile devices having sleek, low z-thickness form factors. It is with respect to these and other considerations that the present improvements have been needed. Such improvements may become critical as the desire to provide high quality imaging in a variety of devices such as mobile devices becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
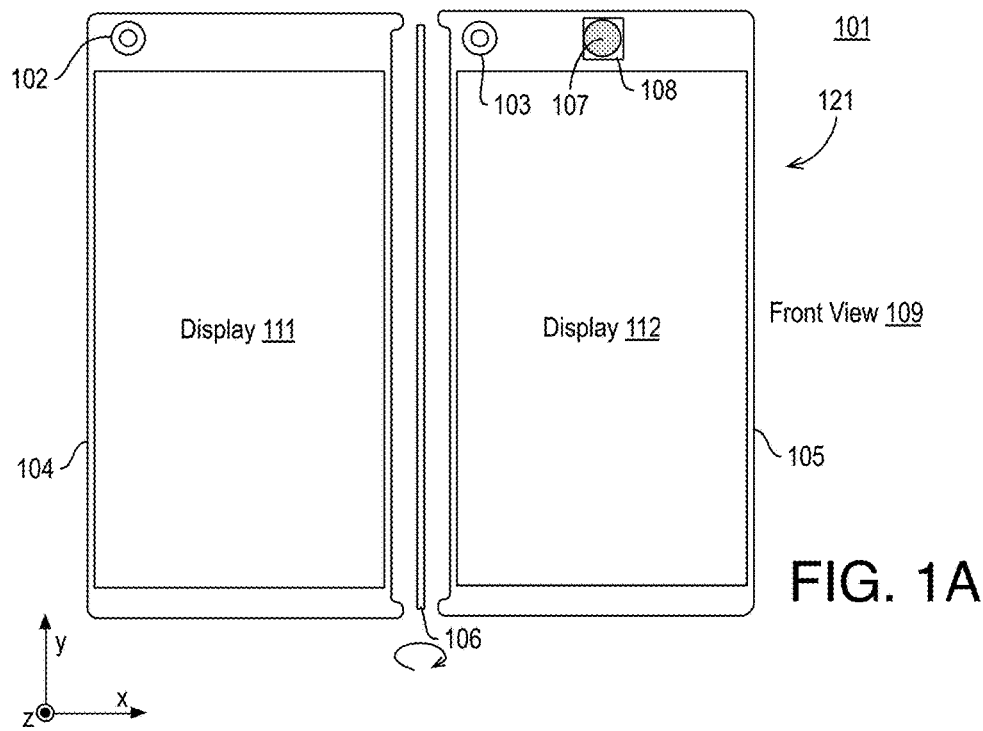
FIG. 1A illustrates a front view of an example mobile device having a complementary component within an opening of a housing thereof to provide enhanced performance of an operative component in particular a configuration.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, over, under, and so on, may be used to facilitate the discussion of the drawings and embodiments and are not intended to restrict the application of claimed subject matter. Therefore, the following detailed description is not to be taken in a limiting sense and the scope of claimed subject matter defined by the appended claims and their equivalents.

In the following description, numerous details are set forth, however, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "in one embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not specified to be mutually exclusive.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," "on", and/or the like, as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening features.

Devices and systems are described below related to device form factors that provide, in a particular configuration, alignment between an operative component and a complementary component to enhance performance of the operative component.

In some embodiments discussed herein, a device such as a mobile device includes an operative component such as a camera or flash or the like and a display integrated into a first housing of the mobile device. A user interface component is integrated into a second housing of the mobile device moveably coupled to the first housing. A complementary component, to enhance performance of the operative component, is disposed within an opening of the second housing such that the second housing being moveably coupled to the first housing provides movement between a first configuration (or positioning) of the mobile device and a second configuration (or positioning) of the mobile device. In the first configuration, the display, the user interface component, and the operative component are exposed from the mobile device to provide the user access to the functionality of each of the components. In the second configuration, the operative component is adjacent to and aligned with the complementary component within the opening of the second housing. Thereby, the first configuration may offer a useful form factor for a user of the device. For example, multiple displays may be exposed in a direction of the user's viewing or the like. Furthermore, in the second configuration, the performance of the operative component may be improved or enhanced by the alignment with the complementary component. For example, the operative component may be a camera and the complementary component may be an optical zoom to provide improved imaging performance and/or capabilities for the camera. In another example, the operative component may be a flash and the complementary component may be a flash focusing lens system to focus the flash within a scene.

As used herein, the term operative component includes any device, component, or element that provides a useful functionality by attaining or analyzing light, power, waves, or the like from the surroundings of the device such as an image sensor, an audio sensor, or the like or provides light, power, or the like to the surroundings to influence the surroundings of the device such as a flash, a light source, or the like. For example, operative components may include a camera, a flash, a sensor, a speaker, a microphone, or the like. Also, as used herein, the term complementary component includes any device, component, or element that provides an improvement, enhancement, or adjustment with respect to its corresponding operative component by modifying the light, power, waves, or the like (e.g., a signal) from the surroundings of the device before they interact with the operative component or by modifying the light, power, waves, or the like from the operative component before it issues to the surroundings. For example, complementary components may include an optical zoom, an optical filter, a flash focusing lens system, audio filters, or the like.

In an embodiment, a lens system design is provided for a folded mode (e.g., configuration) of a dual/foldable display form factor device to provide improved or differentiated imaging capabilities (e.g., as compared to capabilities without the lens system) for a corresponding small form factor camera. Such embodiments may provide advantageous form factor devices for users along with improved imaging. Furthermore, by providing adjacent operative and complementary components in various configurations of devices, thicker designs may be integrated into devices (e.g., implemented when the components are adjacent to one another) that would otherwise not be available within the form factor constraints of the devices.

In some embodiments, an opening (e.g., a through-hole) is provided in the housing or chassis of the mobile device such as a dual/foldable display form factor device. The opening may house a complementary element such as additional optical elements for a corresponding operative element such as a camera. In the context of imaging, the additional optical element or elements improve the imaging solutions (e.g., provide improved optical zoom) or provide new imaging solutions (e.g., enabling hyperspectral imaging) by using the additional z-thickness provided by the opening when the device is in a particular configuration such as a compact mode or configuration. As discussed further herein, the opening is located such that it may house the complementary element or elements so that it is aligned to the operative element when in a particular configuration such as a compact mode. The complementary element may be permanent (e.g., fixedly integrated into the opening) or the complementary element may be plugged into the opening (e.g., removably integrated into the opening) such that complementary elements may be swapped out by a user of the device.

Figure 1B:
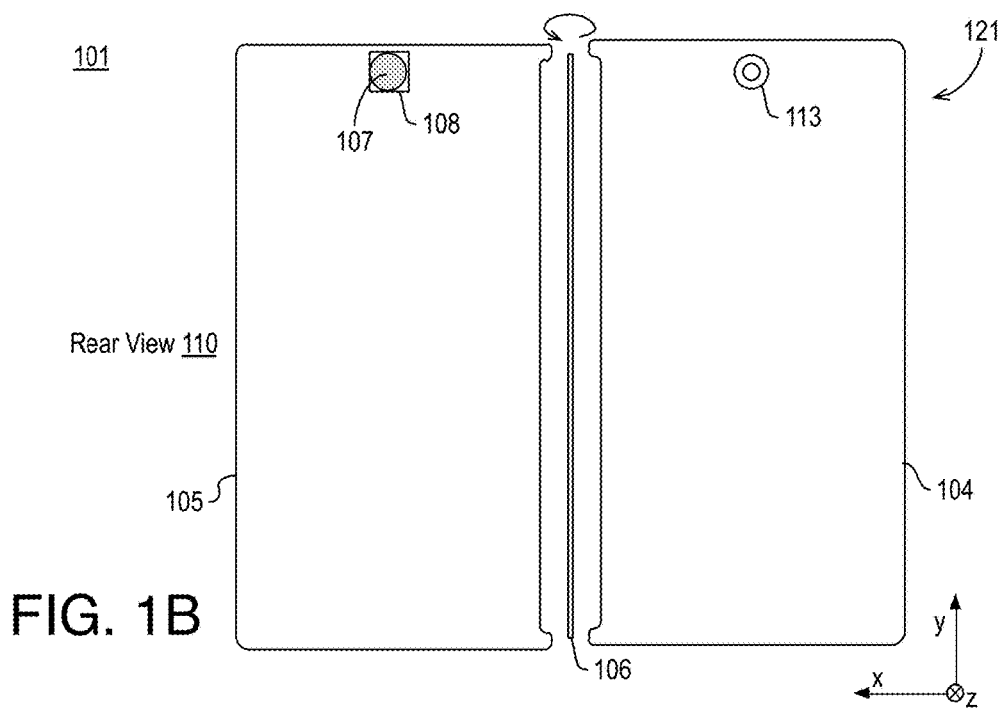
FIG. 1B illustrates a rear view of the mobile device of FIG. 1A.
Figure 1C:
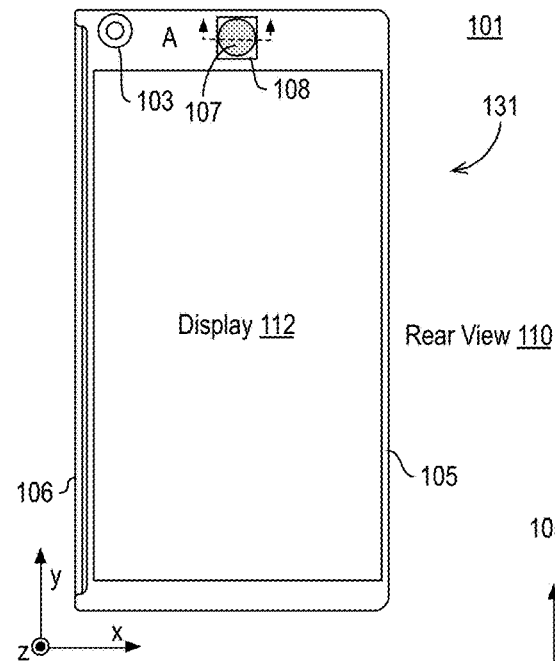
FIG. 1C illustrates front view of the mobile device of FIG. 1A in a compact configuration.
Figure 1D:
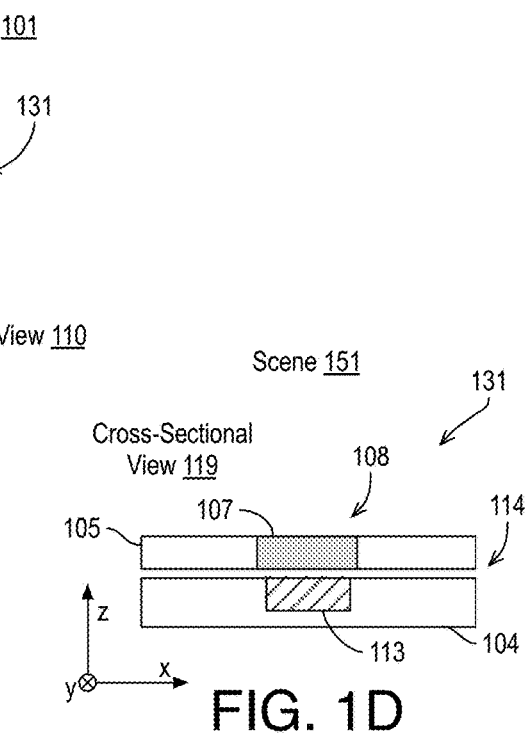
FIG. 1D illustrates a cross-sectional view of the mobile device of FIG. 1A in the compact configuration.
Figure 1E:
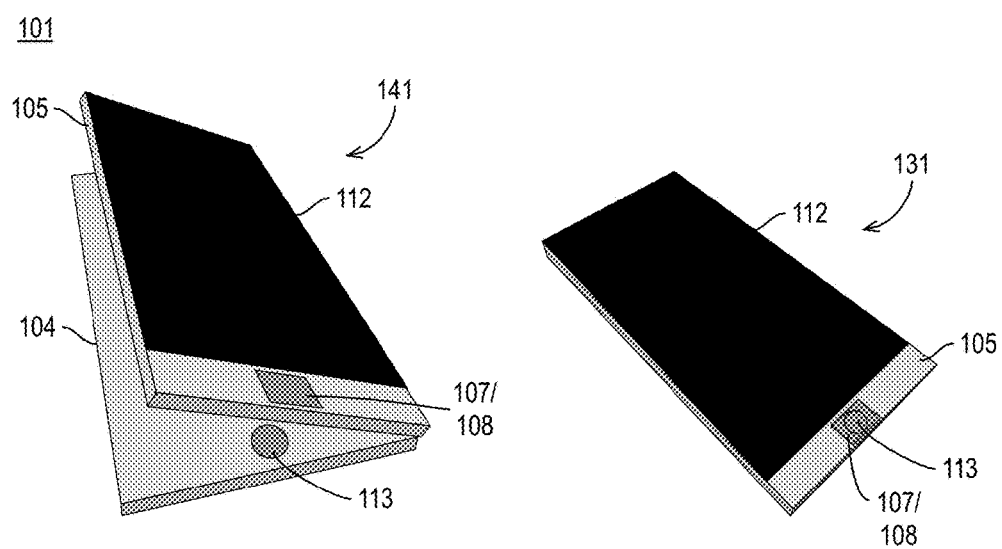
FIG. 1E provides 3D views of the mobile device of FIG. 1A in a semi-closed configuration and a compact configuration.

FIG. 1A illustrates a front view 109 of an example mobile device 101 having a complementary component within an opening of a housing thereof to provide enhanced performance of an operative component in particular a configuration, arranged in accordance with at least some implementations of the present disclosure. FIG. 1B illustrates a rear view 110 of mobile device 101, arranged in accordance with at least some implementations of the present disclosure. As shown, FIGS. 1A and 1B illustrate mobile device 101 in an open configuration 121. FIG. 1C illustrates front view 109 of mobile device 101 in a compact configuration 131, arranged in accordance with at least some implementations of the present disclosure. FIG. 1D illustrates a cross-sectional view 119 of mobile device 101 in compact configuration 131 taken along view A in FIG. 1C, arranged in accordance with at least some implementations of the present disclosure. FIG. 1E provides 3D views of mobile device 101 in a semi-closed configuration 141 and compact configuration 131, arranged in accordance with at least some implementations of the present disclosure.

As shown, mobile device 101 may include a housing 104 and a housing 105 that are moveably coupled to one another by a hinge 106 (which is shown in an exploded view in FIGS. 1A and 1B for the sake of clarity of presentation). As used herein the term housing includes any device structure that may include or house any number of device components. For example, a housing may include an independent chassis or the like. For example, mobile device 101 may include any number of housings. Housings 104, 105 may have any suitable thicknesses (e.g., z-dimensions) such as low profile thickness of about 4.5 mm, 4.75 mm, 4.85 mm, 5.5 mm, 6 mm, or the like. As shown, hinge 106 allows housing 104 and housing 105 to rotate about hinge 106 to provide movement between open configuration 121 and compact configuration 131. For example, hinge 106 provides a rotational coupling of housings 104, 105 about hinge 106. In open configuration 121, housings 104, 105 may be substantially planar with respect to one another along the x-y plane or with an obtuse angle (along the x-direction) therebetween such that a user of mobile device 101 may view and/or interact with a display 111 integrated into housing 104 and a display 112 integrated into housing 105 simultaneously. In some examples, displays 111, 112 may include a touch display such that displays 111, 112 may receive touch input from a user.

Although discussed with respect to hinge 106, housings 104, 105 may be moveably coupled to one another using any suitable technique or techniques such as a flexible member between housings 104, 105. In other form factors, housings 104, 105 may be slidably coupled to one another as is discussed further herein. Furthermore, as shown, display 111 may integrated into housing 104. As used herein the term integrated into includes any integration of a device or component into a housing. For example, the component may be mounted to a chassis of the housing and a skin may also be mounted to the chassis such that the component and the skin are substantially flush. In other examples, the component may be mounted to a skin of the housing or the like. As will be appreciated, the component being integrated into the housing must or may (depending on the component) be exposed to an environment and or use of mobile device 101. In the illustrated example, mobile device 101 includes displays 111, 112. In other embodiments, one or both of displays 111, 112 may be or may include user interface devices such as key pads, stylus sensor pads or the like. As used herein, the term user interface component includes displays, touch sensitive displays, key pads, input sensors, or any device used to interact with a user. Furthermore, mobile device 101 may optionally include a front facing camera 102 integrated into housing 104 and/or a front facing camera 103 integrated into housing 105.

Also as shown, housing 105 of mobile device 101 includes an opening 108 and an optical element 107 within opening 108 and a rear facing camera 113 integrated into housing 104. Optical element 107 is illustrated as a shaded circle and opening 108 is illustrated as a square for the sake of clarity of presentation. However, optical element 107 and opening 108 may have any suitable shapes such as circular, square, rectangular, or the like and they may have the same shape or the they may be different. Optical element 107 may include any optical element such as a lens or lenses or the like that adjusts the light from a surroundings of mobile device 101 prior to the light reaching camera 113.

As shown in FIGS. 1C and 1D, when mobile device 101 is moved to compact configuration 131 (e.g., by a user), optical element 107 within opening 108 is adjacent to and aligned with (e.g., along the z-axis) rear facing camera 113, which is obscured in FIG. 1C, such that an image of a scene 151 may be captured by camera 113 with the aid of optical element 107. In the context of the coordinate system established herein, in FIG. 1C, with reference to FIG. 1A, housing 104 has been folded behind housing 105. It is noted that the user of mobile device in such a context moves from out of the page (e.g., in a positive z-direction) with respect to FIG. 1A to in the page with respect to FIG. 1C (e.g., in a negative z-direction and operating an opposite side of mobile device 101 to that presented in FIG. 1C). Likewise, scene 151, which is opposite mobile device 101 moves from in the page (e.g., in a negative z-direction) with respect to FIG. 1A to out of the page with respect to FIG. 1C (e.g., in a positive z-direction).

As discussed, opening 108 may provide a through hole in housing 104. As discussed, by bringing optical element 107 within opening 108 near and in alignment with camera 113 (which is front facing in compact configuration 131), improved optical performance may be provided for mobile device 101. For example, optical element 107 may be a fixed or active optical zoom (e.g., a zoom lens or lens system), an optical filter, or the like to improve the image quality of images attained by camera 113. For example, an optical zoom may provide any suitable zoom factor such as a 2x zoom, a 3x zoom, or the like. For example, a zoom lens thickness of about 5 mm may provide for a fixed or variable zoom of up to about a 3x optical zoom. Furthermore, the optical filter may include one or a combination of a neutral density filter, an ultraviolet (UV) filter, an infrared (IR) filter, a polarizer filter, a color filter, or the like. In some embodiments, to mitigate alignment problems between optical element 107 and camera 113, the aperture of optical element 107 may be larger than the sensor of camera 113. As shown in FIG. 1D, in some examples, a gap 114 may be provided between housing 104 and housing 105 and between camera 113 and optical element 107 in compact configuration 131. In other examples, little or no gap may be provided between either housing 104 and housing 105 or between camera 113 and optical element 107. In some examples, gap 114 may be provided between housing 104 and housing 105 but no gap may be provided between camera 113 and optical element 107.

Although illustrated with respect to camera 113 and optical element 107, mobile device 101 may integrate any suitable operative component into housing 104 and any suitable complementary component into housing 105 such that, in compact configuration 131, the operative and complementary components are brought into alignment and adjacent to one another such that the complementary component may enhance the performance of the operative component (and such that in open configuration 121 no such enhancement is provided since the components are not adjacent nor aligned with one another). In the illustrated embodiment, the operative component is camera 113 (which may include any suitable components such as a lens or lenses, an aperture, and an image sensor within a camera module) and the complementary component is optical element 107 (which may include a zoom lens system, an optical filter or filters, or the like). In some embodiments, the operative component is a flash and the complementary component is a flash focusing lens system. In other embodiments, the operative component is a hyperspectral imaging camera (e.g., to attain image information for wavelengths of light that are not in the visible spectrum) and the complementary component is a hyperspectral optical filter. In yet other embodiments, the operative component is a hyperspectral flash or hyperspectral light source such as a light emitting diode (LED) hyperspectral flash or hyperspectral light source and the complementary component is a hyperspectral optical filter. For example, such hyperspectral cameras and flashes may be suitable for food inspection or the like.

As shown in FIG. 1E, mobile device 101 may move from open configuration 121 (please refer to FIG. 1A) through a semi-closed configuration 141 to compact (or closed) configuration 131. Open configuration 121 may offer a user of mobile device 101 with an advantageous form factor that provides a substantial amount of display surface while compact configuration 131 may provide less display surface but a better form factor for single hand holding of mobile device 101, a form factor for image capture, a form factor suitable for storage, or the like. For example, compact configuration 131 may provide a comfortable image capture position for a user while camera 113 and optical element 107 are aligned to enhance the imaging performed by mobile device 101 as discussed.

As illustrated in FIGS. 1A-1E, mobile device 101 includes camera 113 and display 111 integrated into housing 104, display 112 integrated into housing 105, and optical component 107 disposed within opening 108 of housing 105. As discussed, the moveable coupling between housing 104 and housing 105 of mobile device 101 provides for movement between open configuration 121 and compact configuration 131. In open configuration 121, display 112 and display 111 face toward a positive z-direction from mobile device 101 (please refer to FIG. 1A which illustrates the z-axis coming out of the page). For example, display 112 and display 111 may face toward a user of mobile device 101 in open configuration 121. Furthermore, in open configuration 121, camera 113 faces toward a negative z-direction from mobile device 101 (please refer to FIG. 1B which illustrates the z-axis entering the page and a negative z-direction coming out of the page). For example, camera 113 may face away from a user (e.g., opposite the direction toward the user) of mobile device 101 in open configuration 121 to provide a rear facing camera toward a scene.

In compact configuration 131, display 112 may face toward a positive z-direction from mobile device 101, display 111 may face toward a negative z-direction from mobile device 101, and camera 113 is adjacent to and aligned with optical component 107 with camera 113 facing the positive z-direction from mobile device 101 (please refer to FIGS. 1C and 1D) with the user moving from the positive z-direction to the negative z-direction when mobile device 101 moves from open configuration 121 to compact configuration 131 as discussed above. It is noted that the coordinate system discussed herein is presented merely for the sake of clarity of presentation of mobile device 101.

FIGS. 1A-1E illustrate an arrangement for enhanced or differentiated imaging (e.g., by providing optical element 107) over configurations without optical element 107 aligning with camera 113. As shown in FIG. 1E, housing 105 includes opening 108 (e.g., a through hole) that houses optical element 107 (e.g., a lens system or optical filter or the like). On the rear side of the housing 104, camera 113 is mounted such that in compact configuration 131 (e.g., a folded configuration or mode), optical element 107 aligns with optical element 107 in opening 108 to augment the capabilities of camera 113, thereby providing the enhanced or differentiated imaging.

As discussed, in some examples, housing 105 includes opening 108 to hold a complementary component such as optical component 107. The complementary component may be fixed within opening 108 (e.g., glued, mounted, or otherwise securely integrated into opening 108) or the complementary component may be removably integrated within opening 108 (e.g., with a clip, a manual release, or the like) such that the complementary component may be removed by a user and a different complementary component may be installed. For example, in the context of imaging systems, a zoom lens system may be swapped out for an optical filter or the like. Furthermore, the complementary component may be a passive component (e.g., a component that may not be actuated) or the complementary component may be an active component that may be actuated. For example, a zoom lens system may have a moveable lens element, an optical filter grouping may have moveable filters that may be moved into and out of opening 108, and so on. Such examples are discussed further herein with respect to FIGS. 7A, 7B, 7C, and 7D. In some embodiments, a complementary component is not provided within opening 108.

Figure 2:
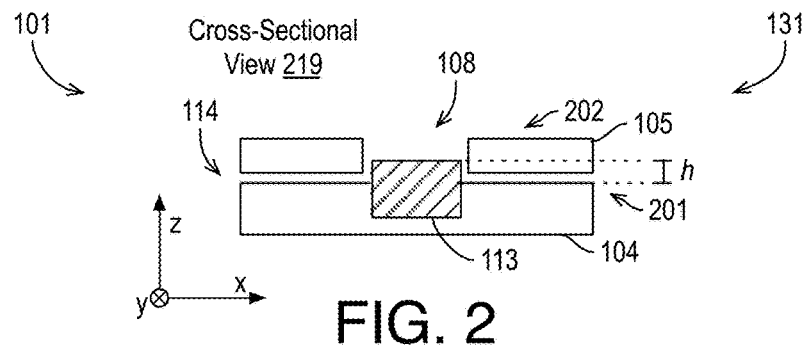
FIG. 2 illustrates an example housing of mobile device having an opening to accommodate an operative component.

FIG. 2 illustrates an example housing 105 of mobile device 101 having opening 108 to accommodate an operative component, arranged in accordance with at least some implementations of the present disclosure. FIG. 2 provides an illustration analogous to FIG. 1D. As shown, housing 105 of mobile device 101 may include opening 108 such that opening 108 does not have a complementary component disposed therein. Such a configuration may advantageously provide for camera 113 (or any operative component) to extend by a distance h above face 201 of housing 104 such that h may be in the range of about 1 to 4 mm. As shown, in some examples, opening 108 may extend entirely through housing 105. In other examples, a translucent protective film or layer may be provided over opening 180 along face 202 of housing 105 to protect camera 113 (or any operative component) in compact configuration 131.

Figure 3:
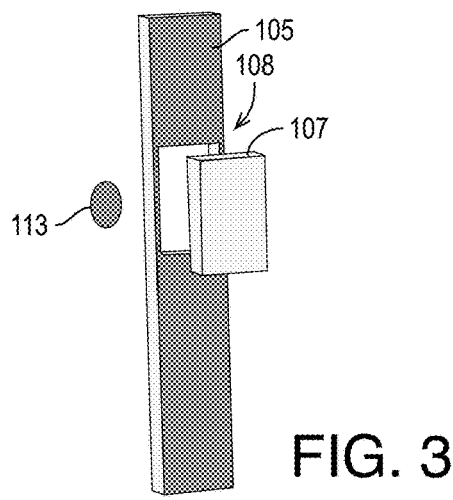
FIG. 3 illustrates an exploded view of an example housing and an example optical element of a mobile device.

FIG. 3 illustrates an exploded view 300 of example housing 105 and optical element 107 of mobile device 101, arranged in accordance with at least some implementations of the present disclosure. As shown in FIG. 3, optical element 107 may be removably disposed within opening 108 of housing 105 of mobile device 101. For example, housing 105 may provide a clip, slot, latch, or the like that may secure optical element 107 (or any complementary component) but that may release optical element 107 (or any complementary component) upon actuation by a user. Such a configuration may provide a flexible design for users as well as the opportunity for manufacturers to fabricate housing 105 with opening 108 that may later be filled or utilized by a complementary component inserted by a user.

As discussed, in some examples, housing 105 includes opening 108 having optical component 107 disposed therein to enhance the performance capabilities of camera 113. Also as discussed, any complementary component and operative component combination may be implemented. Furthermore, more than one combination of complementary and operative component may be implemented within the same mobile device. Any number of combinations of complementary and operative components may be implemented within the same mobile device. Such complementary and operative components may be implemented side-by-side such that the complementary components are each in their own openings or such that the complementary components are installed in the same opening. In other examples, the complementary and operative components may be installed on separate regions or areas of mobile device 101. For example, with reference to FIGS. 1A-1E, another combination of complementary and operative components may be installed such that: another operative component is next to camera 113 in housing 104 and the corresponding complementary component is in a separate opening of housing 105, another operative component is next to camera 113 in housing 104 and the corresponding complementary component is in the same (enlarged) opening 108 as optics component 107, or another operative component is in housing 104 but not next to camera 113 (e.g., at a bottom of the device) and the corresponding complementary component is in a separate opening of housing 105. Similarly, the additional operative component maybe installed in housing 105 and a corresponding complementary component may be an opening of housing 104.

Figure 4:
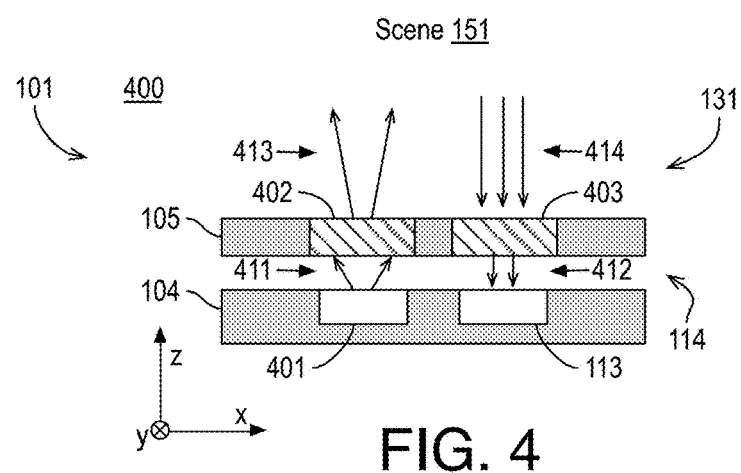
FIG. 4 illustrates an example configuration of a mobile device having multiple combinations of operative and complementary components disposed therein.

FIG. 4 illustrates an example configuration 400 of mobile device 101 having multiple combinations of operative and complementary components disposed therein, arranged in accordance with at least some implementations of the present disclosure. FIG. 4 provides an illustration analogous to FIG. 1D. Furthermore, FIG. 4 illustrates the implementation of multiple combinations of operative and complementary components as well as an example of a flash implemented with a flash focusing lens system, which as discussed, may be implemented independently as a operative and complementary component combination.

As shown in FIG. 4, configuration 400 includes housing 105 having openings (not shown) having a flash focusing lens system 402 and an optical zoom 403 disposed therein. Furthermore, a flash 401 and camera 113 are integrated into housing 104 such that, in compact configuration 131, flash focusing lens system 402 is aligned with and adjacent to flash 401 and optical zoom 403 is aligned with and adjacent to camera 113. For example, flash focusing lens system 402 may focus a flash 411 provided by flash 401 to a particular region of a field of view (FOV) of camera 113. For example, the region of the FOV may be a particular region of scene 151 (e.g., a region representing a person, an object of interest, or the like). For example, flash 411 provided by flash 401 as a flash cone, which may be altered by flash focusing lens system 402 to provide a flash cone 413 onto scene 151. Also as shown, in concert, camera 113 may receive light 414 from scene 151 after it passes through optical zoom 403 as sensed light 412. Based on sensed light 412, camera 113 may generate image data corresponding to scene 151, which may be stored to a memory of mobile device 101, transmitted to a remote device, and so on. Camera 113 and flash 401 (and corresponding flash focusing lens system 402 and optical zoom 403) may provide for imaging in the visible spectrum or hyperspectral imaging.

Although illustrated with respect to a combination of camera 113 and optical zoom 403 and a second combination of flash 401 and flash focusing lens system 402, any operative component and complementary component combinations may be implemented. Furthermore, FIG. 4 illustrates two combinations of operative and complementary components. However, any number of combinations of operative and complementary components may be implemented such as three, four, or more. In an embodiment, an array (e.g., two or more) of any such combinations of operative and complementary components (e.g., complementary systems) may be provided. In the context of an array of cameras as the operative components, such an array may provide a fusion of filter and zoom based camera images to improve image quality such as resolution, noise removal, haze removal, or the like. For example, each camera may be provided with different complementary components such as one or more optical zooms, one or more optical filters, etc. and each camera may attain an image of a scene. Such images may optionally be combined to or otherwise manipulated to generate a final image having improved image quality with respect to an image that may be attained by any of the cameras alone.

As discussed, housings 104, 105 of mobile device 101 may be moveably coupled by a hinge or similar component such that housings 104, 105 are movable between open configuration 121 and compact configuration 131. In some embodiments, housings 104, 105 may be moveably coupled, at least partially, by a display substrate including displays 111, 112. In some embodiments, housings 104, 105 may be slidably coupled. Furthermore, in compact configuration 131, cameras 103, 113 may both face a scene away from the user of mobile device 101. In such instances, cameras 103, 113 may be used in conjunction with one another to increase a zoom range of mobile device 101.

Figure 5:
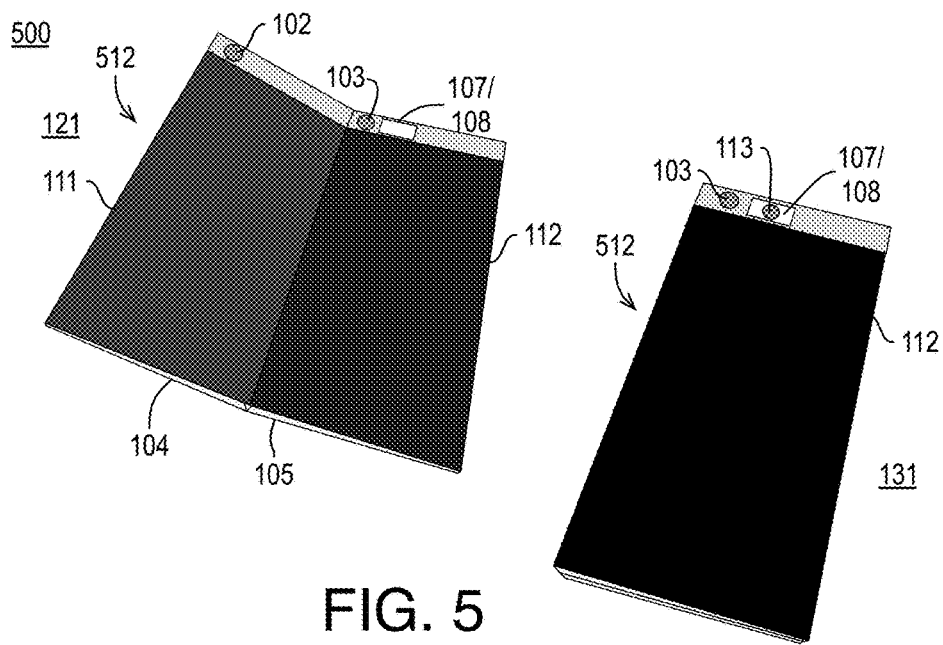
FIG. 5 illustrates an example configuration of a mobile device having a dual camera configuration and a single flexible substrate display.

FIG. 5 illustrates an example configuration of mobile device 101 having a dual camera configuration and a single flexible substrate display, arranged in accordance with at least some implementations of the present disclosure. As shown in FIG. 5, in open configuration 121, mobile device 101 may include displays 111, 112 on or incorporated into a single flexible display substrate 512. In an embodiment, single flexible display substrate 512 provides a flexible substrate on which separate displays 111, 112 are disposed. In another embodiment, single flexible display substrate 512 provides displays 111, 112 such that single flexible display substrate 512 is or includes a display (e.g., display elements, driver circuitry, etc.) and displays 111, 112 are regions of single flexible display substrate 512. Also as shown in FIG. 5, single flexible display substrate 512 may, at least partially, couple housings 104, 105 such that single flexible display substrate 512 is a monolithic structure that is integrated into both housings 104, 105 by being attached to the chassis of housings 104, 105, by being attached to a skin of housings 104, 105, or the like.

Also as shown in FIG. 5, in compact configuration 131, single flexible display substrate 512 may wrap around housings 104, 105. As discussed, in open configuration 121, displays 111, 112 may advantageously provide a large display surface for a user while compact configuration 131 may provide for ease of handling by a user. In the illustration of FIG. 5, cameras 103, 113 (as visible through optical element 107 as disposed in opening 108) may be exposed to the same scene (e.g., in the positive z-direction, please refer to FIG. 1C.

For example, the dual camera set up of FIG. 5 with cameras 103, 113 exposed to the same scene may provide camera 103 as a user facing camera in open configuration 121 and camera 113 as a rear facing camera in open configuration 121 (please refer to FIG. 1B showing camera 113 on a rear surface of housing 104). As discussed, camera 113 and optical element 107 disposed in opening 108 are aligned such that optical element 107 provides an optic for camera 113 in compact configuration 131. Configuration 500 may act as a dual camera setup to provide enhanced imaging for mobile device 101. Configuration 500 may be provided with any suitable housings and couplings between such housings discussed herein. For example, the combination of camera 113 and optical element 107 may provide a greater zoom with respect to camera 103. Using such a system, camera 103 may be used for imaging at low zoom up to a predetermined zoom amount such as a zoom factor of 2.4× (e.g., through a digital zoom) or the like and beyond the predetermined zoom amount such as from a zoom factor of 2.5× (e.g., through optical zoom), camera 113 and optical element 107 provide imaging for mobile device 101.

As discussed, multiple device housings may be moveably coupled between configurations such that, in a first configuration, an operative component and a complementary component are not aligned and, in second configuration, the operative component and the complementary component are aligned and adjacent to one another such that the complementary component enhances the performance of the operative component in some manner due to them being aligned and adjacent. In some embodiments, the housings may be moveably coupled by a hinge or a flexible member (optionally including a display or displays) or the like such that the coupling is rotational. In other embodiments, the housings may be moveably coupled by tracks or the like such that the coupling is a sliding coupling. In yet other embodiments, movement between open and compact configurations may be provided by a foldable display (e.g., with no need for a hinge or similar coupling).

Figure 6A:
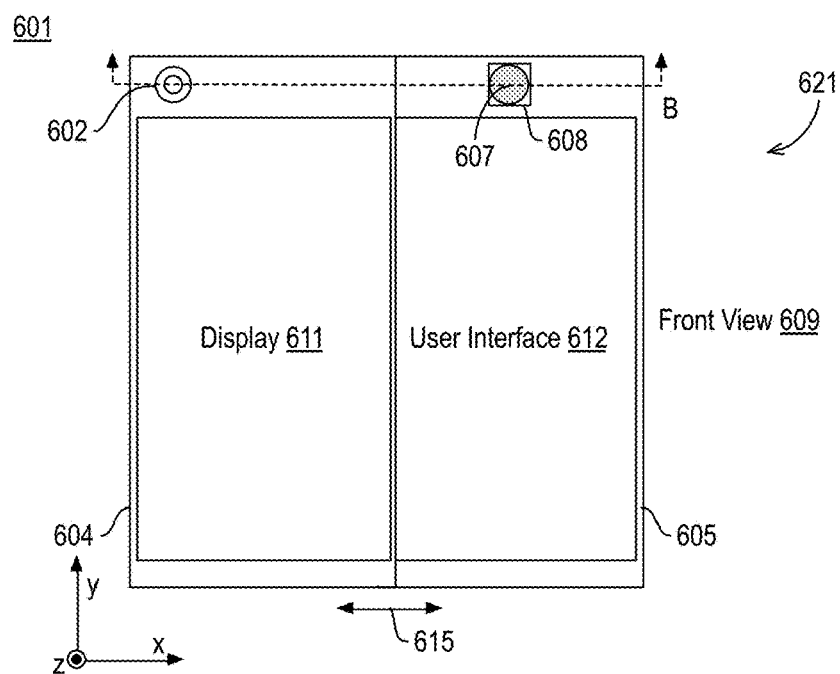
FIG. 6A illustrates a front view of an example mobile device having a complementary component within an opening of a housing thereof to provide enhanced performance of an operative component in a particular configuration.
Figure 6B:
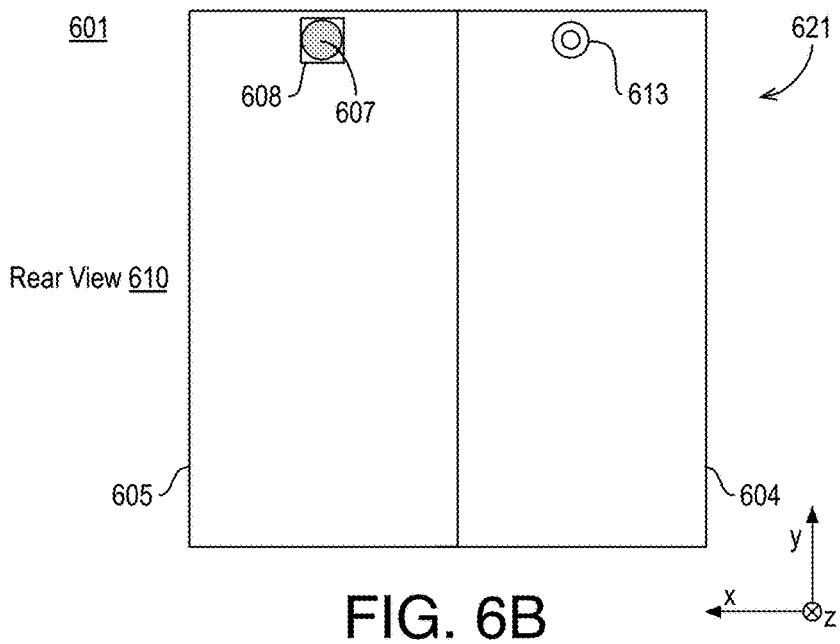
FIG. 6B illustrates a rear view of the mobile device of FIG. 6A.
Figure 6C:
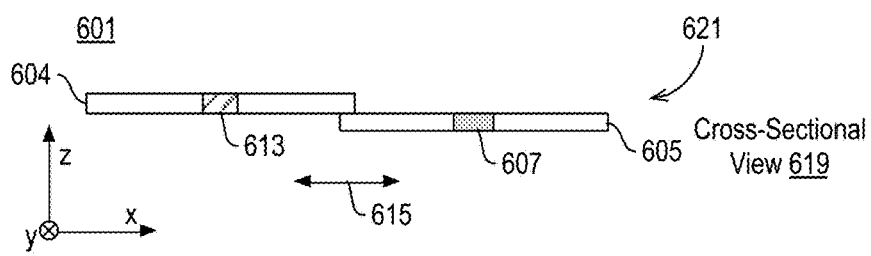
FIG. 6C illustrates a cross-sectional view of the mobile device of FIG. 6A.
Figure 6D:
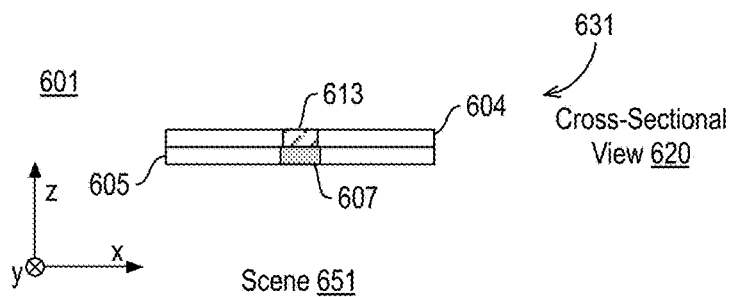
FIG. 6D illustrates a cross-sectional view of the mobile device of FIG. 6A in a compact configuration.

FIG. 6A illustrates a front view 609 of an example mobile device 601 having a complementary component within an opening of a housing thereof to provide enhanced performance of an operative component in a particular configuration, arranged in accordance with at least some implementations of the present disclosure. FIG. 6B illustrates a rear view 610 of mobile device 601, arranged in accordance with at least some implementations of the present disclosure. FIG. 6C illustrates a cross-sectional view 619 of mobile device 601. As shown, FIGS. 6A, 6B, and 6C illustrate mobile device 601 in an open configuration 621. FIG. 6D illustrates a cross-sectional view 620 of mobile device 601 in a compact configuration 631 in taken along view B in FIG. 6A, arranged in accordance with at least some implementations of the present disclosure.

As shown, mobile device 601 may include a housing 604 and a housing 605 that are moveably coupled to one another along a direction 615. In FIG. 6A, housing 605 is partially obscured by housing 604 for the sake of clarity of presentation. As will be appreciated, in fully open configuration 621, housing 605 would be fully extended from housing 604. Housings 604, 605 may have any suitable thicknesses (e.g., z-dimensions) as discussed with respect to housing 104, 105. In some examples, housings 604, 605 have the same thickness and, in other examples, they are different. For example housing 605 may be thicker than housing 604 to provide support for mobile device 601. Housings 604, 605 may be moveably (e.g., slidably) coupled using any suitable technique or techniques. For example, housing 604 and/or housing 605 may include a channel or slot and the other may include a tab or rail to provide a slidable coupling therebetween. In open configuration 621, housings 604, 605 may be substantially planar with respect to one another along the x-y plane or housing 605 may be slightly below housing 604 in the fully extended position. In any event, a user of mobile device 601 may view and/or interact with a display 611 integrated into housing 604 and a user interface 612 integrated into housing 605 simultaneously.

In the illustrated example, mobile device 601 includes display 611 and user interface 612. In other embodiments, one or both of display 611 or user interface 612 may be or may include other devices discussed herein. For example, display 611 may be or may include any user interface devices such as key pads, stylus sensor pads, or the like. Furthermore, user interface 612 may include any user interface device discussed herein or user interface 612 may be a display. As used herein, the term user interface component includes display, key pads, input sensors, or any device used to interact with a user. Furthermore, mobile device 601 may optionally include a front facing camera 602 integrated into housing 604 and/or a front facing camera (not shown) integrated into housing 605.

As shown, housing 605 of mobile device 601 includes an opening 608 and an optical element 607 within opening 608 and a rear facing camera 613 integrated into housing 604. As shown in FIGS. 6C and 6D, when mobile device 601 is moved to compact configuration 631, optical element 607 within opening 608 is adjacent to and aligned with (e.g., along the z-axis) rear facing camera 613 such that an image of a scene 651 may be captured by camera 613 with the aid of optical element 607. For example, opening 608 may provide a through hole in housing 604. As discussed, by bringing optical element 607 within opening 608 near and in alignment with camera 613, improved optical performance may be provided for mobile device 601. Camera 613 and optical element 607 may have any features and/or may be replaced with any alternative operative components and complementary components as discussed here with respect to mobile device 101. For example, optical element 607 may be an optical zoom (e.g., a zoom lens or lens system), an optical filter, or the like to improve the image quality of images attained by camera 613. For example, the optical filter may include one or a combination of a neutral density filter, an ultraviolet (UV) filter, an infrared (IR) filter, a polarizer filter, or the like. In some embodiments, to mitigate alignment problems between optical element 607 and camera 613, the aperture of optical element 607 may be larger than the sensor of camera 613. As shown in FIG. 6D, in some examples, little or no gap may be provided between housings 604, 605 in compact configuration 631. In other examples, a gap may be provided.

Although illustrated with respect to camera 613 and optical element 607, mobile device 601 may integrate any suitable operative component into housing 604 and any suitable complementary component into housing 605 such that, in compact configuration 631, the operative and complementary components are brought into alignment and adjacent to one another such that the complementary component may enhance the performance of the operative component (and such that in open configuration 621 no such enhancement is provided). In the illustrated embodiment, the operative component is camera 613 (which may include any suitable components such as a lens or lenses, an aperture, and an image sensor within a camera module) and the complementary component is optical element 607 (which may include a zoom lens system, an optical filter or filters, or the like). In some embodiments, the operative component is a flash and the complementary component is a flash focusing lens system (as discussed with respect to FIG. 4). In other embodiments, the operative component is a hyperspectral imaging camera (e.g., to attain image information for wavelengths of light that are not in the visible spectrum)

and the complementary component is a hyperspectral optical filter. In yet other embodiments, the operative component is a hyperspectral flash or hyperspectral light source such as a light emitting diode (LED) hyperspectral flash or hyperspectral light source and the complementary component is a hyperspectral optical filter. For example, such hyperspectral cameras and flashes may be suitable for food inspection or the like.

As illustrated in FIGS. 6A-6D, mobile device 601 includes camera 613 and display 611 integrated into housing 604, user interface 612 integrated into housing 605, and optical component 607 disposed within opening 608 of housing 605. As discussed, the moveable coupling between housing 604 and housing 605 of mobile device 601 provides for movement between open configuration 621 and compact configuration 631. In open configuration 621, user interface 612 and display 611 face toward a positive z-direction from mobile device 601 (please refer to FIG. 6A which illustrates the z-axis coming out of the page). For example, user interface 612 and display 611 may face toward a user of mobile device 601 in open configuration 621. Furthermore, in open configuration 621, camera 613 faces toward a negative z-direction from mobile device 601 (please refer to FIG. 6B which illustrates the z-axis entering the page and a negative z-direction coming out of the page). For example, camera 613 may face away from a user (e.g., opposite the direction toward the user) of mobile device 601 in open configuration 621 to provide a rear facing camera toward a scene.

In compact configuration 631, display 611 may face toward a positive z-direction from mobile device 101, user interface 612 may face toward a positive z-direction from mobile device 601 but may be obscured from a user, and camera 613 is adjacent to and aligned with optical component 607 with camera 613 facing the negative z-direction from mobile device 601 (please refer to FIGS. 6C and 6D) toward scene 651. For example, camera 613 may face away from the user and toward scene 651 to attain an image of the scene while display 611 faces the user to provide an image capture user interface for the user (please refer to the illustration of housing 104 in FIG. 1A).

In analogy with the discussion provided with respect to mobile device 101, the complementary component (e.g., optical element 607) may be fixed within opening 608 (e.g., glued, mounted, etc.) or the complementary component may be removably integrated within opening 608 (e.g., with a clip, a manual release, etc.) such that the complementary component may be removed by a user and a different complementary component may be installed. The complementary component may be a passive component (e.g., a component that may not be actuated) or the complementary component may be an active component that may be actuated. For example, a zoom lens system may have a moveable lens element, an optical filter grouping may have moveable filters that may be moved into and out of opening 108, and so on.

Figure 7A:
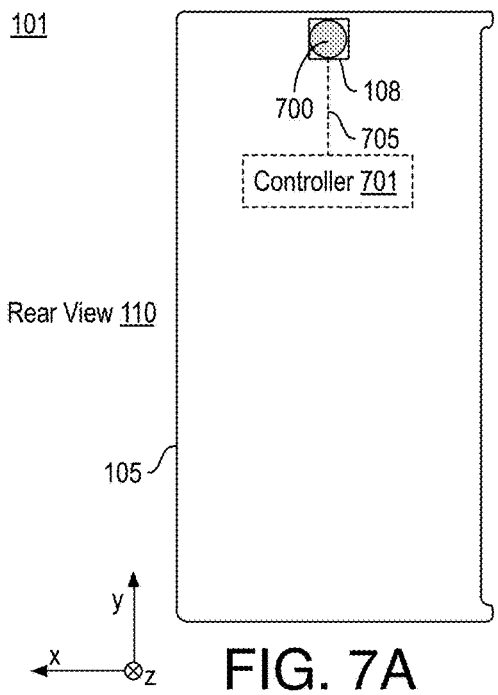
FIG. 7A illustrates an example active complementary component for an example mobile device.
Figure 7B:
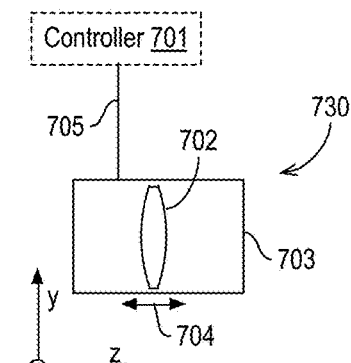
FIG. 7B illustrates an example zoom lens active component for the mobile device of FIG. 7A.
Figure 7C:
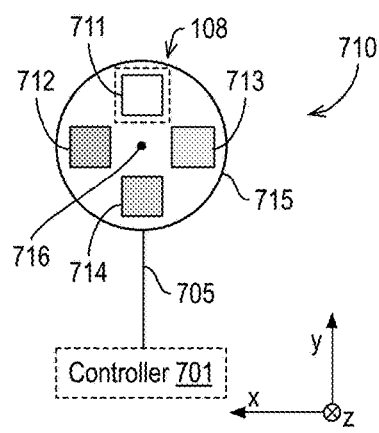
FIG. 7C illustrates an example optical filter bank active component for the mobile device of FIG. 7A.
Figure 7D:
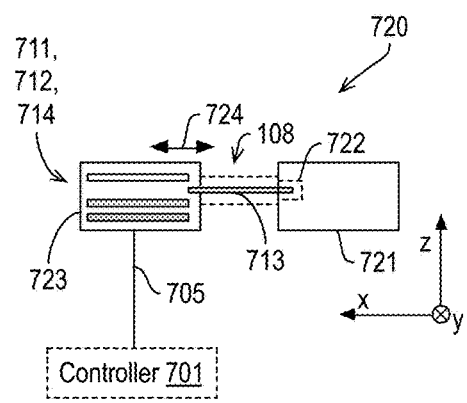
FIG. 7D illustrates another example optical filter bank active component for the mobile device of FIG. 7A.

FIG. 7A illustrates an example active complementary component 700 for example mobile device 101, arranged in accordance with at least some implementations of the present disclosure. FIG. 7B illustrates an example zoom lens active component 730, arranged in accordance with at least some implementations of the present disclosure. FIG. 7C illustrates an example optical filter bank active component 710, arranged in accordance with at least some implementations of the present disclosure. FIG. 7D illustrates another example optical filter bank active component 720, arranged in accordance with at least some implementations of the present disclosure.

Active complementary component 700 may be any suitable active complementary component that may enhance the performance of a corresponding operative component (not shown) such as a zoom lens or zoom lens system, an optical filter bank, or the like. Active complementary component 700 may be fixed within opening 108 or active complementary component 700 may be removably integrated within opening 108. In examples where active complementary component 700 is fixed within opening 108, active complementary component 700 may be installed within portions of housing 105 that extend beyond opening 108.

As shown in FIG. 7A, active complementary component 700 may be installed within opening 108 of mobile device 101. Although illustrated and discussed with respect to mobile device 101, the described active complementary component 700, traces, and controller may be applied to any mobile device discussed herein. As shown, active complementary component 700 is coupled to a controller 701 by a electrical trace 705 such that controller 701 may control active complementary component 700 during the operation of mobile device 701. For example, electrical trace 705 may be coupled to complementary component 700 and configured to provide a signal to actuate a moveable component of complementary component 700. Controller 701 may be any suitable integrated circuit, circuitry, or the like that provides signaling or power or the like to control active complementary component 700. For example, controller 701 may be a microprocessor or the like. Electrical trace 705 may include any suitable coupling between controller 701 and active complementary component 700 such as a metallization, a wiring, a trace on a circuit board, or the like. As shown in FIG. 7B, in some examples, mobile device 101 may include zoom lens active component 730. As shown, zoom lens active component 730 may include a housing 703 and one or more lenses 702. Although illustrated with a single moveable lens 702 moveable along a direction 704, zoom lens active component 730 may include any number of fixed and moveable lenses. As shown, controller 701 may provide a signal or power or the like to zoom lens active component 730 via electrical trace 705 to move lens 702 to provide a zoom capability as discussed herein. Lens 702 may be moved along direction 704 within housing 703 using any suitable technique or techniques such as using an electric motor (not shown) capable of moving lens 702 to various positions within housing 703.

As shown in FIG. 7C, in some examples, mobile device 101 may include optical filter bank active component 710. As shown, optical filter bank active component 710 may include a dial 715 and multiple optical filters 711, 712, 713, 714 having different optical properties mounted within dial 715 such that, when rotated around center axis 716, a selected optical filter, which is optical filter 711 in the illustrated example, may be provided within opening 108. Optical filters 711, 712, 713, 714 may include any suitable optical filters in the visible spectrum, hyperspectral filters, or the like. For example, optical filters 711, 712, 713, 714 may include a neutral density filter, a UV filter, an IR filter, a polarizer, a color filter, or the like. In an embodiment, one of optical filters 711, 712, 713, 714 may be a blank filter or translucent element or the like to effectively provide no filtering. Although illustrated with four optical filters 711, 712, 713, 714, any number and type of filters may be used. As shown, controller 701 may provide a signal or power or the like to optical filter bank active component 710 via electrical trace 705 to move dial 715 to provide one of optical filters 711, 712, 713, 714 within opening 108. Dial 715 may be moved using any suitable technique or techniques such as using an electric motor (not shown) capable of moving optical filters 711, 712, 713, 714 to various positions to provide one of optical filters 711, 712, 713, 714 within opening 108.

As shown in FIG. 7D, in some examples, mobile device 101 may include optical filter bank active component 720. As shown, optical filter bank active component 720 may include a housing 723 holding multiple optical filters 711, 712, 713, 714 analogous to those presented in FIG. 7C and having the same or similar properties. As shown, controller 701 may provide a signal or power or the like to optical filter bank active component 720 via electrical trace 705 to an active or selected filter or filters, which in the illustrated example is a single optical filter 713 within opening 108. The selected filter(s) (e.g., any of optical filters 711, 712, 713, 714 provided within optical filter bank active component 720) may be moved along a direction 724 using any suitable technique or techniques such as using an electric motor (not shown) capable of moving a selected one or more of optical filters 711, 712, 713, 714 to a position within opening 108. As also shown in FIG. 7D, housing 105 may include a portion 721 having a receiver 722 that provides a receiving opening for a portion of the selected one or more of optical filters 711, 712, 713, 714. For example, receiver 722 may provide stability for the selected one or more of optical filters 711, 712, 713, 714 while it is provided within opening 108.

As discussed herein, active or passive complimentary components may be provided within an opening of a housing such that, in a particular configuration, the complimentary component(s) are aligned with and adjacent to corresponding active components. A mobile device may include a single combination of complimentary and operative components or multiple combinations side-by-side as discussed herein and, in particular, with respect to FIG. 4. In other examples multiple active or passive complimentary components may be provided for a single operative component. For example, active or passive complimentary components may be stacked within opening 108 to provide enhanced performance for the single operative component. For example, an active or passive zoom and an active or passive optical filter or filter system may be stacked (e.g., in the z-direction) within opening 108 of housing 105.

As discussed, the complimentary component (e.g., a lens system, etc.) may be fixed or removable (e.g., pluggable), passive (e.g., static) or active (e.g., dynamic), and single element or multiple element (e.g., side-by-side or stacked). In the fixed design, the complimentary component may be assembled and fused into the housing or chassis while in the pluggable design, the complimentary component may be provided separately from mobile device such that it may be plugged into the opening or hole by a user. In the static design, the complimentary component may provide a static configuration such as a fixed optical zoom factor or a fixed spectrum filter or the like. In the dynamic design, the complimentary component may provide the enhancements for the corresponding operative component during the operation of the mobile device (e.g., at run time). As discussed, active component implementations may be achieved using motors that move lenses or set of lenses, optical filters or sets of optical filters, or the like and/or adjust the positioning of the lens or filters to achieve the required enhancement. For example, in a single element design, a single optical element may be used while in the stacked form, multiple optical elements may be stacked together to achieve the desired enhancement.

Figure 8:
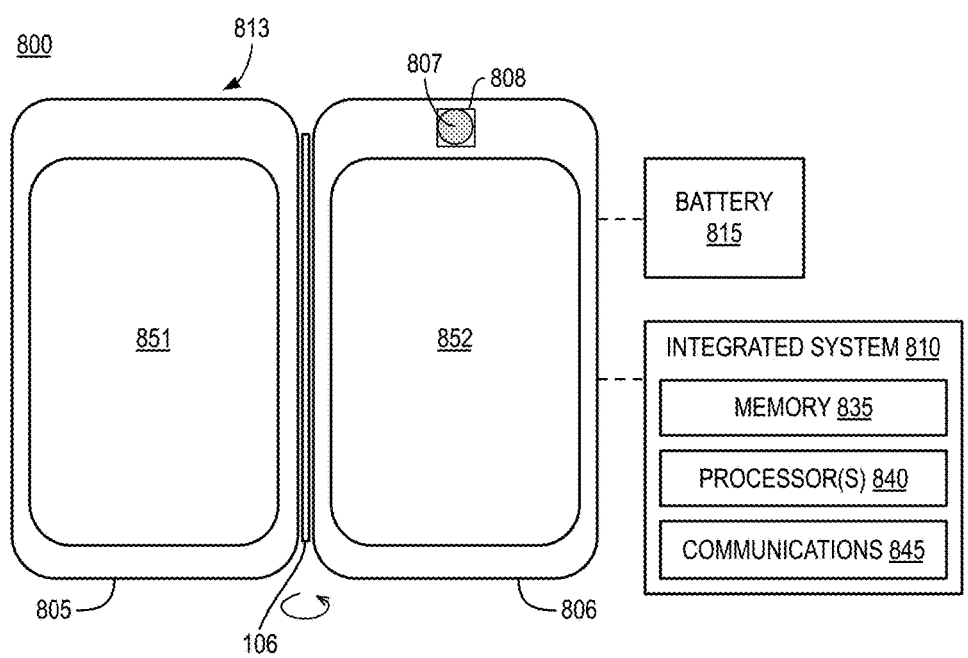
FIG. 8 illustrates a system in which a mobile computing platform employs operative and complimentary components that are aligned in a compact configuration.

FIG. 8 illustrates a system 800 in which a mobile computing platform employs operative and complimentary components that are aligned in a compact configuration, arranged in accordance with at least some implementations of the present disclosure. System 800 may be any portable device configured for one or more of electronic data display, electronic data processing, wireless electronic data transmission, or the like. For example, although illustrated as a foldable smartphone, system 800 may be any of a tablet, a laptop computer, a watch, an augmented reality device, a virtual reality device, a headset etc.

As shown, system 800 may include a housing 805 having a user interface device 851 integrated therein and a housing 806 moveably coupled to housing 805 by hinge 106 having a user interface device 852 integrated therein. Housings 805, 806 may include any housings discussed herein. Housings 805, 806 are illustrated as being moveably coupled to one another by hinge 106, but housings 805, 806 may be moveably coupled to one another using any suitable technique or techniques such as being slidably coupled, being coupled by a flexible display substrate or the like. User interface devices 851, 852 may include any user interface devices such as displays, touch displays, key pads, stylus sensor pads, etc.

Also as illustrated in FIG. 8, system 800 includes a complementary component 807 disposed within an opening 808 of housing 806 and an operative component 813 on a back of housing 805 such that, when system 800 is moved from the open configuration of FIG. 8 to a compact or closed configuration, complementary component 807 and operative component 813 are aligned and adjacent to one another such that complementary component 807 enhances the performance of operative component 813. Also as shown, system 800 includes a chip-level or package-level integrated system 810 and a battery 815. In the illustrated example, integrated system 810 is disposed within housing 806. In another example, integrated system 810 is disposed within housing 805. In yet another example, each of housings 804, 805 include an integrated system or a portion thereof.

Integrated system 810 may be implemented as discrete components (e.g., integrated circuits) or as a system on a chip and may include may include memory circuitry 835 (e.g., random access memory, storage, etc.), processor circuitry 840 (e.g., a microprocessor, a multi-core microprocessor, graphics processor, etc.), and communications circuitry 845 (e.g., a wireless transceiver, a radio frequency integrated circuit, a wideband RF transmitter and/or receiver, etc.). The components of integrated system 810 may be communicatively coupled to one another for the transfer of data within integrated system 810. Functionally, memory circuitry 835 may provide memory and storage for integrated system 810 including image and/or video data for display user interface devices 851, 852, processor circuitry 840 may provide high level control for system 810 as well as operations corresponding to generating image and/or video data for display by user interface devices 851, 852 and/or operations corresponding to generating signals or power to operate an active complementary component 807, if employed, and communications circuitry 845 may transmit and/or receive data including image and/or video data for display by display device 850 and/or data generated by operative component 813 such as image and/or video data or the like. For example, communications circuitry 745 may be coupled to an antenna (not shown) to implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond.

Figure 9:
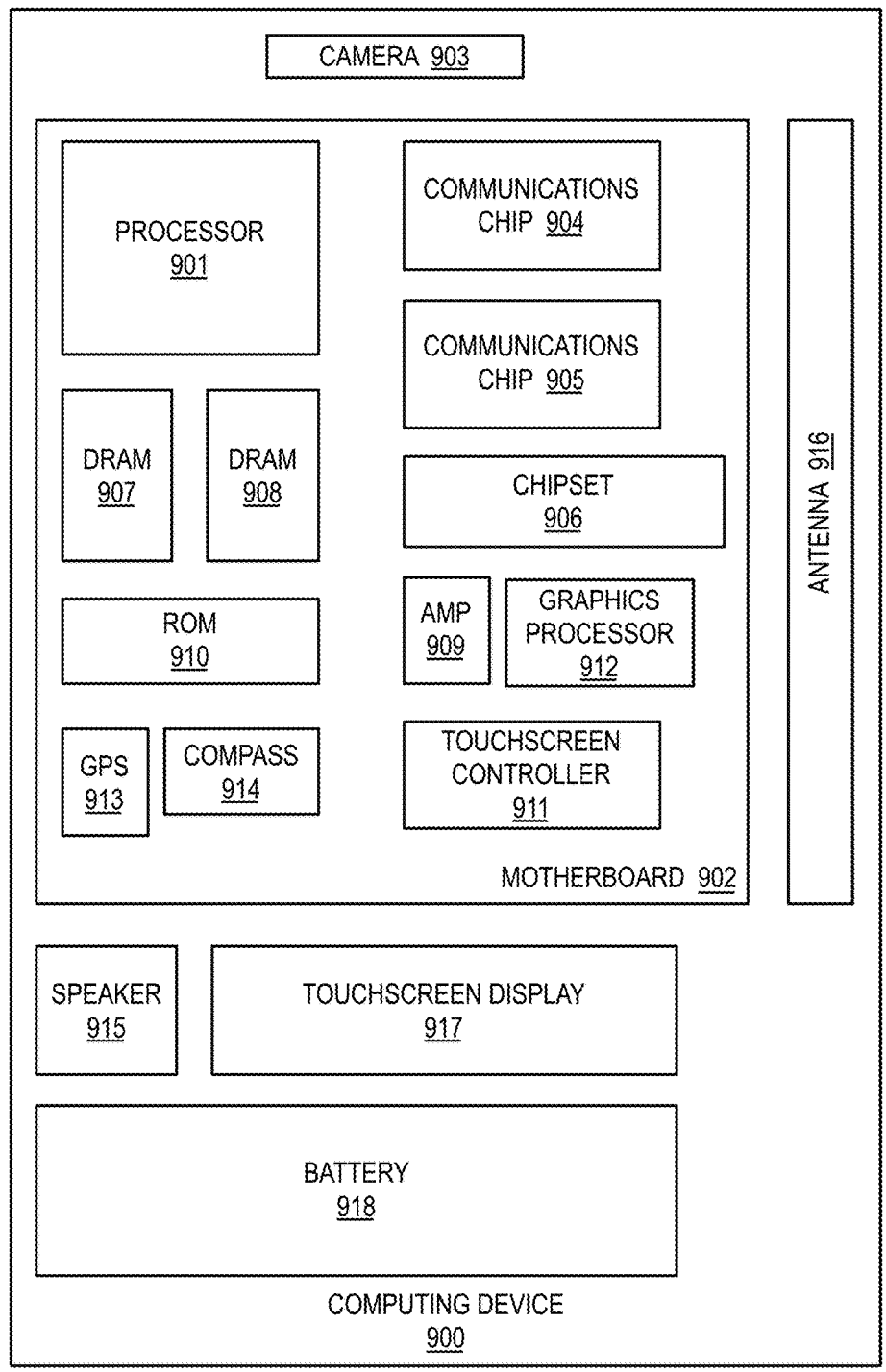
FIG. 9 is a functional block diagram of a computing device, all arranged in accordance with at least some implementations of the present disclosure.

FIG. 9 is a functional block diagram of a computing device 900, arranged in accordance with at least some implementations of the present disclosure. Computing device 900 or portions thereof may be implemented via system 800, for example, and further includes a motherboard 902 hosting a number of components, such as, but not limited to, a processor 901 (e.g., an applications processor, a microprocessor, etc.) and one or more communications chips 904, 905. Processor 901 may be physically and/or electrically coupled to motherboard 902. In some examples, processor 901 includes an integrated circuit die packaged within the processor 901. In general, the term "processor" may refer to any device or portion of a device that processes electronic data from registers and/or memory to transform that electronic data into other electronic data that may be stored in registers and/or memory.

In various examples, one or more communication chips 904, 905 may also be physically and/or electrically coupled to the motherboard 902. In further implementations, communication chips 904 may be part of processor 901. Depending on its applications, computing device 900 may include other components that may or may not be physically and electrically coupled to motherboard 902. These other components may include, but are not limited to, volatile memory (e.g., DRAM) 907, 908, non-volatile memory (e.g., ROM) 910, a graphics processor 912, flash memory, global positioning system (GPS) device 913, compass 914, a chipset 906, an antenna 916, a power amplifier 909, a touchscreen controller 911, a touchscreen display 917, a speaker 915, a camera 903, and a battery 918, as illustrated, and other components such as a digital signal processor, a crypto processor, an audio codec, a video codec, an accelerometer, a gyroscope, and a mass storage device (such as hard disk drive, solid state drive (SSD), compact disk (CD), digital versatile disk (DVD), and so forth), or the like. For example, touchscreen display 917 may implement any light emitting diode structure(s) or micro light emitting diode(s) discussed herein.

Communication chips 904, 905 may enable wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Communication chips 904, 905 may implement any of a number of wireless standards or protocols, including but not limited to those described elsewhere herein. As discussed, computing device 900 may include a plurality of communication chips 904, 905. For example, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others. For example, one or both of communication chips 904, 905 may provide a wireless transceiver for computing device 900. As discussed, touchscreen display 917 of computing device 900 may include or utilize one or more micro light emitting diodes such as any light emitting diode structure s discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first examples, a mobile device comprises an operative component and a first user interface component integrated into a first housing, a second user interface component integrated into a second housing moveably coupled to the first housing, and a complementary component, to enhance performance of the operative component, disposed within an opening of the second housing, wherein the second housing being moveably coupled to the first housing provides movement between a first configuration of the mobile device and a second configuration of the mobile device, and wherein, in the first configuration, the first user interface component, the second user interface component, and the operative component are exposed from the mobile device and, in the second configuration, the operative component is adjacent to and aligned with the complementary component within the opening of the second housing.

In one or more second examples, for any of the first examples, the operative component comprises a camera and the complementary component comprises one of an optical zoom or an optical filter.

In one or more third examples, for any of the first examples, the operative component comprises a flash and the complementary component comprises a flash focusing lens system.

In one or more fourth examples, for any of the first examples, the operative component comprises a hyperspectral imaging camera and the complementary component comprises a hyperspectral optical filter.

In one or more fifth examples, for any of the first examples, the operative component comprises a hyperspectral light source and the complementary component comprises a hyperspectral optical filter.

In one or more sixth examples, for any of the first through fifth examples, the mobile device further comprises a second operative component integrated into the first housing and a second complementary component, to enhance performance of the second operative component, within one of the opening or a second opening of the second housing, wherein, in the second configuration, the second operative component is aligned with the second complementary component within the opening of the second housing.

In one or more seventh examples, for any of the first through sixth examples, the operative component comprises a camera, the complementary component comprises one of an optical zoom or an optical filter, the second operative component comprises a flash, and the second complementary component comprises a flash focusing lens system.

In one or more eighth examples, for any of the first through seventh examples, the second housing being moveably coupled to the first housing comprises one of a hinge coupling the first housing and the second housing, a slidable coupling between the first housing and the second housing, or a flexible coupling between the first housing and the second housing.

In one or more ninth examples, for any of the first through eighth examples, the first user interface component comprises a first display and the second user interface component comprises a second display such that the first display and the second display are provided on a same flexible display substrate and wherein the second housing being moveably coupled to the first housing comprises at least the flexible display substrate coupling the first housing and the second housing.

In one or more tenth examples, for any of the first through ninth examples, the complementary component being within the opening of the second housing comprises the complementary component being one of fixedly integrated into the opening or removably integrated into the opening of the second housing.

In one or more eleventh examples, for any of the first through tenth examples, the mobile device further comprises an electrical trace coupled to the complementary component and configured to provide a signal to actuate a moveable component of the complementary component.

In one or more twelfth examples, for any of the first through eleventh examples, the operative component comprises a camera, the complementary component comprises an optical zoom, and the moveable component comprises a lens of the optical zoom.

In one or more thirteenth examples, for any of the first through twelfth examples, the operative component comprises a camera, the complementary component comprises a plurality optical filters, and the moveable component comprises an individual optical filter of the plurality of optical filters.

In one or more fourteenth examples, for any of the first through thirteenth examples, the operative component comprises a camera, the complementary component comprises an optical zoom, and the moveable component comprises a lens of the optical zoom or wherein the operative component comprises a camera, the complementary component comprises a plurality optical filters, and the moveable component comprises an individual optical filter of the plurality of optical filters.

In one or more fifteenth examples, for any of the first through fourteenth examples, the mobile device further comprises or a system comprising the mobile device further comprises a memory and a processor coupled to the memory such that the processor and the memory are disposed within the first or second housing.

In one or more sixteenth examples, for any of the first through fifteenth examples, the operative component is a camera, the first user interface component is a first display, the second user interface component is a second display, the complementary component is an optical component, the first configuration is an open configuration of the mobile device, and the second configuration is a compact configuration of the mobile device, such that, in the open configuration, the first display and the second display face toward a first direction from the mobile device and the camera faces toward a second direction from the mobile device opposite the first direction and, in the compact configuration, the first display faces toward the first direction, the second display faces toward the second direction and the camera is adjacent to and aligned with the optical component within the opening of the second housing and facing toward the second direction.

In one or more seventeenth examples, for any of the first through sixteenth examples, the optical component comprises a passive optical component and the optical component is fixedly integrated into the opening.

In one or more eighteenth examples, for any of the first through seventeenth examples, the optical component comprises an active optical component and the optical component is removably integrated into the opening.

In one or more nineteenth examples, a mobile device or system comprises a sensing means and a first means for interfacing with a user integrated into a first housing, a second means for interfacing with a user integrated into a second housing coupled to the first housing by a coupling means, and a signal adjustment means disposed within an opening of the second housing, wherein the coupling means provides for movement between an open configuration of the mobile device and a compact configuration of the mobile device, and wherein, in the open configuration, the first means for interfacing with a user and the second means for interfacing with a user face toward a first direction from the mobile device and the sensing means faces toward a second direction from the mobile device opposite the first direction and, in the compact configuration, the first means for interfacing with a user faces toward the first direction, the second means for interfacing with a user faces toward the second direction and the sensing means is adjacent to and aligned with the signal adjustment means within the opening of the second housing and facing toward the second direction.

In one or more twentieth examples, for any of the nineteenth examples, the first means for interfacing with a user and the second means for interfacing with a user are provided on a same flexible substrate and wherein the coupling means comprises at least the flexible substrate.

In one or more twenty-first examples, for any of the nineteenth or twentieth examples, the sensing means comprises one of a visible light camera or a hyperspectral camera and wherein the signal adjustment means comprises one of an optical zoom or an optical filter.

In one or more twenty-second examples, for any of the nineteenth through twenty-first examples, the signal adjustment means comprises a passive optical component that is fixedly integrated into the opening.

In one or more twenty-third examples, for any of the nineteenth through twenty-second examples, the signal adjustment means comprises an active optical component that is removably integrated into the opening.

In one or more twenty-fourth examples, for any of the nineteenth through twenty-third examples, the mobile device or system further comprises a signaling means coupled to the signal adjustment means and configured to provide a signal to actuate a moveable component of the signal adjustment means.

It will be recognized that the embodiments is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A mobile device comprising:
   an operative component and a first user interface component integrated into a first housing;
   a second user interface component integrated into a second housing moveably coupled to the first housing; and
   a first complementary component and a second complementary component, both to enhance performance of the operative component, wherein the second housing being moveably coupled to the first housing provides movement between a first configuration of the mobile device and a second configuration of the mobile device, wherein, in the first configuration, the first user interface component, the second user interface component, and the operative component are exposed from the mobile device and, in the second configuration, the operative component is adjacent to and aligned with one of the first or second complementary components within the opening of the second housing, and wherein the second housing comprises one of a clip, slot, or latch to removably secure the first or second complementary components within the opening to allow swapping of the first and second complementary components within the opening by a user.

2. The mobile device of claim 1, wherein the operative component comprises a camera, the first complementary component comprises an optical zoom, and the second complementary component comprises an optical filter.

3. The mobile device of claim 1, wherein the operative component comprises a flash and the first and second complementary components comprise first and second flash focusing lens systems.

4. The mobile device of claim 1, wherein the operative component comprises a hyperspectral imaging camera and the first and second complementary component comprise first and second hyperspectral optical filters.

5. The mobile device of claim 1, wherein the operative component comprises a hyperspectral light source and the complementary component comprise first and second hyperspectral optical filters.

6. The mobile device of claim 1, further comprising:
   a second operative component integrated into the first housing; and
   a third complementary component, to enhance performance of the second operative component, within a second opening of the second housing, wherein, in the second configuration, the second operative component is aligned with the second complementary component within the opening of the second housing.

7. The mobile device of claim 6, wherein the operative component comprises a camera, the first and second complementary components comprise first and second optical filters, the second operative component comprises a flash, and the third complementary component comprises a flash focusing lens system.

8. The mobile device of claim 1, wherein the second housing being moveably coupled to the first housing comprises one of a hinge coupling the first housing and the second housing, a slidable coupling between the first housing and the second housing, or a flexible coupling between the first housing and the second housing.

9. The mobile device of claim 1, wherein the first user interface component comprises a first display and the second user interface component comprises a second display, wherein the first display and the second display are provided on a same flexible display substrate and wherein the second housing being moveably coupled to the first housing comprises at least the flexible display substrate coupling the first housing and the second housing.

10. The mobile device of claim 1, further comprising:
    a second operative component integrated into the first housing and extending beyond a face of the first housing; and
    a second opening extending through the second housing, wherein, in the second configuration, the second operative component is at least partially within the second opening and between first and second faces of the second housing.

11. The mobile device of claim 1, further comprising:
    a second operative component integrated into the first housing;
    a third complementary component, to enhance performance of the second operative component, within a second opening of the second housing, wherein, in the second configuration, the second operative component is aligned with the second complementary component within the opening of the second housing;
    an electrical trace coupled to the second complementary component and configured to provide a signal to actuate a moveable component of the complementary component.

12. The mobile device of claim 11, wherein the second operative component comprises a camera, the third complementary component comprises an optical zoom, and the moveable component comprises a lens of the optical zoom.

13. The mobile device of claim 11, wherein the second operative component comprises a camera, the third complementary component comprises a plurality of optical filters, and the moveable component comprises an individual optical filter of the plurality of optical filters.

14. A system comprising:
    a memory;
    a processor coupled to the memory, wherein the processor and the memory are disposed within a first housing;
    an operative component and a first user interface component integrated into the first housing;
    a second user interface component integrated into a second housing moveably coupled to the first housing; and
    a first complementary component and a second complementary component, both to enhance performance of the operative component, wherein the second housing being moveably coupled to the first housing provides movement between a first configuration of the mobile device and a second configuration of the mobile device, wherein, in the first configuration, the first user interface component, the second user interface component, and the operative component are exposed from the mobile device and, in the second configuration, the operative component is aligned with one of the first or second complementary components within the opening of the second housing, and wherein the second housing comprises one of a clip, slot, or latch to removably secure the first or second complementary components within the opening to allow swapping of the first and second complementary components within the opening by a user.

15. The system of claim 14, wherein the operative component comprises a camera, the first complementary component comprises an optical zoom, and the second complementary component comprises an optical filter.

16. The system of claim 14, further comprising:
a second operative component integrated into the first housing; and
a third complementary component to enhance performance of the second operative component, within a second opening of the second housing, wherein, in the second configuration, the second operative component is aligned with the second complementary component within the opening of the second housing.

17. The system of claim 16, wherein the operative component comprises a camera, the first and second complementary component comprise first and second optical filters, the second operative component comprises a flash, and the third complementary component comprises a flash focusing lens system.

18. A mobile device comprising:
a camera and a first display integrated into a first housing;
a second display integrated into a second housing moveably coupled to the first housing;
an optical component at least partially disposed within an opening of the second housing, wherein the second housing being moveably coupled to the first housing provides movement between an open configuration of the mobile device and a compact configuration of the mobile device, wherein, in the open configuration, the first display and the second display face toward a first direction from the mobile device and the camera faces toward a second direction from the mobile device opposite the first direction and, in the compact configuration, the first display faces toward the first direction, the second display faces toward the second direction and the camera is adjacent to and aligned with the optical component within the opening of the second housing and facing toward the second direction, and wherein the optical component comprises an optical filter bank within a third housing on a first side of the opening, the optical filter bank comprising multiple optical filters, a receiver to receive a selected one of the optical filters on a second side of the opening, and an electric motor to linearly move only the selected one of the optical filters from the third housing to a position within the opening and the receiver.

19. The mobile device of claim 18, wherein the first display and the second display are provided on a same flexible display substrate and wherein the second housing being moveably coupled to the first housing comprises at least the flexible display substrate coupling the first housing and the second housing.

20. The mobile device of claim 18, wherein the camera comprises a hyperspectral camera and the multiple optical filters comprise multiple hyperspectral filters.

21. The mobile device of claim 18, further comprising:
a flash integrated into the first housing and extending beyond a face of the first housing; and
a second opening extending through the second housing, wherein, in the compact configuration, the flash is at least partially within the second opening and between first and second faces of the second housing.

22. The mobile device of claim 18, further comprising:
a flash integrated into the first housing; and
a flash focusing lens system within a second opening of the second housing, wherein, in the compact configuration, the flash is adjacent to and aligned with the flash focusing lens system.

23. The mobile device of claim 18, further comprising:
an electrical trace coupled to the optical component and configured to provide a signal to actuate the electric motor.

* * * * *